(12) United States Patent
Lee (10) Patent No.: US 8,329,780 B2
(45) Date of Patent: *Dec. 11, 2012

(54) ENCAPSULATED COLORANT, METHOD OF PREPARING THE SAME, AND INK COMPOSITION COMPRISING THE ENCAPSULATED COLORANT

(75) Inventor: Jong-in Lee, Suwon-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 592 days.

This patent is subject to a terminal disclaimer.

(21) Appl. No.: 12/169,780

(22) Filed: Jul. 9, 2008

(65) Prior Publication Data

US 2009/0076193 A1    Mar. 19, 2009

(30) Foreign Application Priority Data

Sep. 13, 2007    (KR) .................. 10-2007-0093255

(51) Int. Cl.
    *C08K 9/00*    (2006.01)
(52) U.S. Cl. ........ 523/205; 347/100; 523/160; 523/161; 523/200; 524/104; 524/315; 524/364; 524/379; 524/386; 524/388; 524/555; 524/556; 524/558; 524/560
(58) Field of Classification Search ............... 106/31.45, 106/31.58, 31.75, 31.86; 347/100; 523/160, 523/161, 200, 205; 524/555, 556, 558, 560, 524/104, 315, 364, 379, 386, 388
See application file for complete search history.

(56) References Cited

U.S. PATENT DOCUMENTS

| | | | |
|---|---|---|---|
| 6,203,957 B1 * | 3/2001 | Nomura et al. | 430/110.4 |
| 6,455,220 B1 * | 9/2002 | Cheng | 430/137.14 |
| 6,929,893 B2 * | 8/2005 | Yoshino et al. | 430/108.1 |
| 7,008,977 B2 | 3/2006 | Sakai et al. | |
| 7,119,133 B2 | 10/2006 | Vincent et al. | |
| 2009/0025601 A1 * | 1/2009 | Vasudevan et al. | 106/31.65 |

FOREIGN PATENT DOCUMENTS

KR    1020070074033    7/2007

OTHER PUBLICATIONS

Korean Office Action Issued on Apr. 10, 2012 in KR Patent Application No. 10-2007-0093255.

* cited by examiner

*Primary Examiner* — David W Wu
*Assistant Examiner* — Marie Reddick
(74) *Attorney, Agent, or Firm* — Stanzione & Kim, LLP (57) ABSTRACT

Provided are an encapsulated colorant including a polymer resin and a colorant coated with the polymer resin, wherein the encapsulated colorant includes at least two types of colorants which have different average particle diameters with different distributions. The encapsulated colorant has two types of colorants which have different average particle diameters with different distributions. In the preparation of an encapsulated colorant, a supplementary colorant is added to the preparation of an initially added colorant after a specific period of time. Thus, a polymer resin growing on the colorants has a different size. Thus, the present general inventive concept provides an encapsulated colorant having at least two average particle diameters with different distributions and has beneficial miscibility since the colorants are coated with a polymer resin. The present general inventive concept also provides an ink composition having superior work efficiency in low shear regions such as mixing and transferring the colorants, and in high shear regions such as inkjet ejection.

17 Claims, 2 Drawing Sheets

ENCAPSULATED COLORANT, METHOD OF PREPARING THE SAME, AND INK COMPOSITION COMPRISING THE ENCAPSULATED COLORANT

CROSS-REFERENCE TO RELATED APPLICATIONS

This application claims priority from Korean Patent Application No. 10-2007-0093255, filed on Sep. 13, 2007, in the Korean Intellectual Property Office, the disclosure of which is incorporated herein in its entirety by reference.

BACKGROUND OF THE INVENTION

1. Field of the Invention

The present general inventive concept relates to an encapsulated colorant, a method of preparing the same and an ink composition including the encapsulated colorant, and more particularly, to an encapsulated colorant having at least two types of average particle diameters with different distributions, a method of preparing the same and an ink composition employing the encapsulated colorant.

2. Description of the Related Art

In general, in inkjet printers, colorants embody their inherent colors by selectively absorbing or reflecting visible light, and are classified as dyestuffs and pigments.

Dyestuffs are used in any material to be dyed, such as fibers, leathers, furs, and papers, thereby providing considerable fastness to washing in daylight hours, friction, etc. Pigments are coloring matters in the form of fine particles, and are directly adhered to a surface of the material to be dyed by physical means, to thereby provide their inherent colors.

Dyestuffs are dissolved in solvents such as water, however pigments are generally insoluble in the solvents, and therefore it is important to homogeneously disperse fine particle pigments in a solution and stably maintain the dispersed state without re-aggregation.

Although a water soluble dyestuff-type ink is superior in long-term storage stability since its homogeneity is maintained and also provides a clear color and brightness, it has poor water fastness, light resistance, etc.

On the other hand, although pigment-type ink has high optical density (OD), superior waterfastness and light resistance, and reduced bleeding between colors, it has poorer color clearness and long-term storage stability as compared to dyestuff-type ink. In addition, images printed using pigment-type inks have poor dry and wet rub fastness.

Furthermore, when printing in colors, such as in multicolor printing, with dyestuffs or pigments, bleeding between interfaces of each color occurs, and thus a clarity of the printed images is thereby reduced.

Thus, there is a need to develop an ink composition having superior storage stability which is an advantageous characteristic of the water soluble dyestuff-type ink, good water fastness which is an advantageous characteristic of the pigment-type ink, improved printed gloss, and improved rub resistance.

Meanwhile, a technique of adding a resin to an ink composition has been previously suggested in order to improve rub resistance of ink. However, the addition of the resin increases viscosity of the ink. Although a technique of adding resin particles to ink to inhibit viscosity of ink from being increased, rub resistance is not sufficiently improved since the resin particles and the pigments are independently dispersed in the ink.

In addition, when an ink composition including colorants with uniform particulate size is used, work efficiency may be reduced due to increased viscosity in low shear regions such as mixing and transferring the colorants and the colorants are aggregated in high shear regions such as inkjet ejection due to reduced stability of the particles, thereby blocking nozzles.

Since the above-mentioned problems are not sufficiently overcome merely by adding new additives to the ink composition, there is still a need to improve properties of ink compositions.

SUMMARY OF THE INVENTION

The present general inventive concept provides an encapsulated colorant including at least two types of colorants which have different average particle diameters with different distributions, and are covered with a polymer resin, thereby having superior miscibility.

Additional aspects and/or utilities of the present general inventive concept will be set forth in part in the description which follows and, in part, will be obvious from the description, or may be learned by practice of the general inventive concept.

The present general inventive concept also provides a method of preparing the encapsulated colorant.

The present general inventive concept also provides an ink composition having high work efficiency in low shear regions such as mixing and transferring the colorants and in high shear regions such as inkjet ejection, preventing nozzles being blocked, and forming images having good printed gloss by employing the encapsulated colorant.

The present general inventive concept also provides an ink set including at least two types of ink compositions.

The present general inventive concept also provides a cartridge of an inkjet recording apparatus including the ink set.

The present general inventive concept also provides an inkjet recording apparatus including a cartridge.

The foregoing and/or other aspects and utilities of the present general inventive concept may be achieved by providing an encapsulated colorant comprising a polymer resin and a colorant coated with the polymer resin, wherein the encapsulated colorant comprises at least two types of colorants which have different average particle diameters with different distributions.

The encapsulated colorant of claim 1 may include about 60 to about 80% by weight of a large particulate encapsulated colorant having an average particle diameter of about 100 to about 300 nm and about 20 to about 40% by weight of a small particulate encapsulated colorant having an average particle diameter of about 40 to about 80 nm.

The polymer resin may be prepared by polymerizing a composition which includes a polymerizable unsaturated monomer.

The polymerizable unsaturated monomer may be at least one selected from the group consisting of unsaturated carboxylic acid, vinyl cyanide monomer, unsaturated carboxylic acid alkyl ester, unsaturated carboxylic acid hydroxyalkyl ester, unsaturated carboxylic acid amide and derivatives thereof, aromatic vinyl monomer, methyl vinyl ketone, and vinylidene chloride.

The polymer resin may include a crosslink structure.

The polymer resin may be prepared by polymerizing a composition which includes a polymerizable unsaturated monomer and a crosslinkable monomer.

The crosslinkable monomer may be selected from the group consisting of (meth)acrylate having at least two polymerizable unsaturated groups and vinyl compounds.

The foregoing and/or other aspects and utilities of the present general inventive concept may be achieved by providing a method of preparing an encapsulated colorant comprising at least two types of colorants which have different average particle diameters with different distributions which includes emulsifying a polymerization composition comprising a polymerizable unsaturated monomer, an aqueous medium, a colorant, an emulsifier and a polymerization initiator, preparing a large particulate encapsulated colorant by polymerizing the polymerizable unsaturated monomer on the colorant, and preparing a small particulate encapsulated colorant by adding a supplementary colorant to the mixture during the preparation of the large particulate encapsulated colorant.

The encapsulated colorant may include about 60 to about 80% by weight of a large particulate encapsulated colorant having an average particle diameter of about 100 to about 300 nm and about 20 to about 40% by weight of a small particulate encapsulated colorant having an average particle diameter of about 40 to about 80 nm.

The polymerization composition may include about 500 to about 5,000 parts by weight of the aqueous medium, about 100 to about 300 parts by weight of the colorant, about 0.01 to about 10 parts by weight of the emulsifier and about 0.05 to about 3 parts by weight of the polymerization initiator based on 100 parts by weight of the polymerizable unsaturated monomer.

The amount of the added supplementary colorant may be about 20 to about 120 parts by weight based on 100 parts by weight of the polymerizable unsaturated monomer.

The polymerization composition may further include a crosslinkable monomer and the large particulate encapsulated colorant is prepared by polymerizing the polymerizable unsaturated monomer and the crosslinkable monomer on the colorant.

The foregoing and/or other aspects and utilities of the present general inventive concept may be achieved by providing an ink composition comprising an encapsulated colorant, the ink composition includes a polymer resin, a solvent, and a colorant coated with the polymer resin, wherein the encapsulated colorant comprises at least two types of colorants which have different average particle diameters with different distributions.

An amount of the encapsulated colorant may be about 1 to about 20 parts by weight and the amount of the solvent may be about 80 to about 99 parts by weight based on 100 parts by weight of the ink composition.

The solvent may include at least one organic solvent selected from the group consisting of an monohydric alcohol, a ketone, an ester, a polyhydric alcohol, a nitrogen-containing compound, and a sulfur-containing compound and water.

The ink composition may include a surface tension of about 15 to about 70 dyne/cm at 20° C. and a viscosity of about 1 to about 20 cps at 20° C.

The foregoing and/or other aspects and utilities of the present general inventive concept may be achieved by providing an ink set comprising at least two types of ink compositions which includes a polymer resin; and a colorant coated with the polymer resin, wherein the colorant comprises at least two types of colorants which have different average particle diameters with different distributions.

The foregoing and/or other aspects and utilities of the present general inventive concept may be achieved by providing a cartridge of an inkjet recording apparatus including an ink set which includes a polymer resin, and a colorant coated with the polymer resin, wherein the colorant comprises at least two types of colorants which have different average particle diameters with different distributions.

The foregoing and/or other aspects and utilities of the present general inventive concept may be achieved by providing an inkjet recording apparatus comprising a cartridge which includes a polymer resin and a colorant coated with the polymer resin, wherein the colorant comprises at least two types of colorants which have different average particle diameters with different distributions.

The foregoing and/or other aspects and utilities of the present general inventive concept may be achieved by providing an encapsulated colorant comprising a resin and a colorant coated with the resin, wherein the colorant includes a first colorant having a first average size and a second colorant having a second average size.

The first and second average sizes may respectively correspond to first and second average particle diameters.

The first colorant may have a first distribution and the second colorant may have a second distribution.

BRIEF DESCRIPTION OF THE DRAWINGS

The above and/or other features and utilities of the present general inventive concept will become more apparent by describing in detail exemplary embodiments thereof with reference to the attached drawings in which.

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Hereinafter, the present general inventive concept will now be described more fully with reference to the accompanying drawings, in which exemplary embodiments of the invention are shown.

Reference will now be made in detail to the exemplary embodiments of the present general inventive concept, examples of which are illustrated in the accompanying drawings, wherein like reference numerals refer to the like elements throughout. The exemplary embodiments are described below in order to explain the present general inventive concept by referring to the figures.

The present general inventive concept provides an encapsulated colorant including a polymer resin and a colorant coated with the polymer resin, wherein the colorant includes at least two types of colorants which have different average particle diameters with different distributions.

In exemplary embodiments, the colorant used herein may be dyestuffs and pigments, and any other colorant that is commonly used in the art may be used without limitation. That is, direct dyes, acid dyes, edible dyes, alkali dyes, reactive dyes, dispersing dyes, oil dyes, various pigments, self-dispersing pigments, or a mixture thereof may be used for the colorant. However, the present general inventive concept is not limited thereto.

Exemplary embodiments of the dyes include food black dyes, food red dyes, food yellow dyes, food blue dyes, acid black dyes, acid red dyes, acid blue dyes, acid yellow dyes, direct black dyes, direct blue dyes, direct yellow dyes, anthraquinone dyes, monoazo dyes, disazo dyes, and phthalocyanine derivatives, and exemplary embodiments of the pigments include carbon black, graphite, vitreous carbon, activated charco, activated carbon, anthraquinone, phthalocyanine blue, phthalocyaniene green, diazos, monoazos, pyranthrones, perylene, quinacridone, and indigoid pigments. Exemplary embodiments of the self-dispersing pigments include cabojet-series and CW-series of Orient Chemical, however, the present general inventive concept is not limited thereto.

In exemplary embodiments, the polymer resin may be prepared by polymerizing a composition including a polymerizable unsaturated monomer.

In the current exemplary embodiment, the polymerizable unsaturated monomer may be at least one selected from the group consisting of unsaturated carboxylic acid, vinyl cyanide monomer, unsaturated carboxylic acid alkyl ester, unsaturated carboxylic acid hydroxyalkyl ester, unsaturated carboxylic acid amide and derivatives thereof, aromatic vinyl monomer, methyl vinyl ketone, and vinylidene chloride.

Particularly, in exemplary embodiments, the unsaturated carboxylic acid may be at least one selected from the group consisting of methacrylic acid, acrylic acid, itaconic acid, crotonic acid, fumaric acid, and maleic acid; the unsaturated polycarboxylic acid alkyl ester may be at least one selected from the group consisting of itaconic acid monoethyl ester, fumaric acid monobutyl ester, and maleic acid monobutyl ester; the vinyl cyanide monomer may be acrylonitrile or methacrylonitrile; the unsaturated carboxylic acid amide may be acryl amide, methyacryl amide, itaconic amide or maleic acid mono amide or derivatives thereof; and the aromatic vinyl monomer may be at least one selected from the group consisting of α-methylstyrene, vinyl toluene, or P-methylstyrene.

In addition, in exemplary embodiments, the polymer resin may include a crosslink structure. In the current exemplary embodiment, the polymer resin having a crosslink structure may be prepared by polymerizing a composition including a polymerizable unsaturated monomer and a crosslinkable monomer.

The crosslinkable monomer is a compound having at least two polymerizable unsaturated groups which introduce a crosslink structure into the polymer resin coated on the colorant. Thus, a net-like dense coating of the polymer resin may be formed on the encapsulated colorant of the present general inventive concept. As a result, printed gloss and printed concentration of an ink composition including the encapsulated colorant may vary according to the degree of crosslinking of the polymer resin.

In exemplary embodiments, the crosslinkable monomer may be selected from the group consisting of (meth)acrylate and vinyl compounds.

Exemplary embodiments of the (meth)acrylate are trimethylolpropane tri(meth)acrylate, ditrimethylolpropane tetra (meth)acrylate, pentaerythritol tri(meth)acrylate, pentaerythritol tetra(meth)acrylate, dipentaerythritol penta(meth) acrylate, dipentaerythritol hexa(meth)acrylate, glycerol tri (meth)acrylate, tris(2-hydroxyethyl)isocyanurate tri(meth) acrylate, ethylene glycol di(meth)acrylate, 1,3-butanediol di(meth)acrylate, 1,4-butanediol di(meth)acrylate, 1,6-hexanediol di(meth)acrylate, neopentyl glycol di(meth)acrylate, diethylene glycol di(meth)acrylate, triethylene glycol di(meth)acrylate, dipropylene glycol di(meth)acrylate, bis(2-hydroxyethyl)isocyanurate di(meth)acrylate, an ethylene oxide of initiating alcohol of the (meth)acrylate or poly(meth) acrylate of propylene oxide adducts, oligoester (meth)acrylate, oligoether (meth)acrylate, oligourethane (meth)acrylate and oligoepoxy (meth)acrylate having at least two (meth) acrylate. In some exemplary embodiments, dipentaerythritol hexa(meth)acrylate, dipentaerythritol penta(meth)acrylate, pentaerythritol tetra(meth)acrylate and ditrimethylolpropane tetra(meth)acrylate may be preferable.

Exemplary embodiments of the vinyl compounds include butadiene, divinyl benzene, ethylene glycol divinyl ether, diethylene glycol divinyl ether, and triethylene glycol divinyl ether. However, the present general inventive concept is not limited thereto.

In addition, in exemplary embodiments, the composition for preparing the polymer resin of the encapsulated colorant may further include a chain transfer agent. The chain transfer agent regulates polymerization degree, molecular weight and crosslink degree of the polymer resin which is coated on the colorant, and improves printing properties of an ink composition employing the colorant.

Exemplary embodiments of the chain transfer agent include sulfur containing compounds, phosphorous acid compounds, hypophosphorous acid compounds, and alcohols, however, the present general inventive concept is not limited thereto.

In exemplary embodiments, the sulfur containing compound may be used as the chain transfer agent, since radicals are efficiently generated.

In exemplary embodiment, a sulfur containing compound may be represented by Formula 1.

Formula 1

Here, R is a substituted or unsubstituted C1-C20 alkyl group.

Exemplary embodiments of the sulfur containing compound include n-dodecyl mercaptan, t-dodecyl mercaptan, t-hexadecylmercaptan, lauryl mercaptan, thioglycolic acid, thioacetic acid, and mercaptoethanol, however, the present general inventive concept is not limited thereto.

Exemplary embodiments of the phosphorous acid include phosphorous acid and sodium phosphite, examples of the hypophosphorous acid include hypophosporous acid and sodium hypophosphite, and examples of the alcohol include methyl alcohol, ethyl alcohol, isopropyl alcohol, and n-butyl alcohol. However, the present general inventive concept is not limited thereto.

In exemplary embodiments, the encapsulated colorant may include about 60 to about 80% by weight of a large particulate encapsulated colorant having an average particle diameter of about 100 to about 300 nm, and about 20 to about 40% by weight of a small particulate encapsulated colorant having an average particle diameter of about 40 to about 80 nm.

In further exemplary embodiments, the encapsulated colorant may include about 60 to about 80% by weight, preferably about 65 to about 75% by weight, of a large particulate encapsulated colorant having an average particle diameter of about 100 to about 250 nm, and about 20 to about 40% by weight, preferably 25 to 35% by weight, of a small particulate encapsulated colorant having an average particle diameter of about 50 to about 70 nm.

When an amount of the small particulate encapsulated colorant is less than 20% by weight, work efficiency in low shear regions and high shear regions may not be sufficiently improved since complex particles are formed. On the other hand, when the amount of the small particulate encapsulated colorant is greater than 40% by weight, the amount of small particulate pigments is increased in printed images, and thus optical density is decreased due to light scattering.

When an amount of the large particulate encapsulated colorant is less than 60% by weight, the amount of small particulate pigments is increased in printed images, and thus optical density is decreased. On the other hand, when the amount of the large particulate encapsulated colorant is greater than 80% by weight, work efficiency may not be sufficiently improved in low shear and high shear regions, since the amount of the small particulate encapsulated colorant is relatively too low.

In exemplary embodiments, when the polymer resin includes a crosslink structure, it may include about 30 to about 99% of a gel content.

In the current exemplary embodiment, the gel content is a weight of a material which is not dissolved in an organic solvent and used to evaluate a degree of crosslinking in a polymer resin having a crosslink structure.

In exemplary embodiments, the gel content may be measured by a method described below.

That is, a weight of a polymer resin is measured, and then soluble materials are subject to extraction using a Soxhlet extraction for about 24 hours. In exemplary embodiments, the solvent used for the extraction may be a solvent for the polymer resin and additives included in the polymer resin. In an exemplary embodiment, when the polymer resin is a styrene polymer, an acrylic resin, or a modified polyphenylene ether, toluene is used as the solvent. When the polymer resin is an olefin polymer or polyacetal, trichlorobenzene is used as the solvent. When the polymer resin is polyamide, hexafluoroisopropaneol is used as the solvent.

After the extraction, collected residues are washed with acetone and dried in a vacuum at 140° C. to obtain a dried material. The weight of the dried material is measured and regarded as a dry weight. The gel content (%) is calculated using the equation below.

Gel content(%)=(dry weight of polymer resin after extraction)(g)/(initial weight of polymer resin)(g)×100   Equation When the gel content is less than 30%, a linear polymer resin having a low molecular weight is formed, and thus, the colorant may not be sufficiently surrounded. On the other hand, when the gel content is greater than 99%, the conversion cannot be performed by 100% due to unreacted monomers after polymerization.

The present general inventive concept also provides a method of preparing an encapsulated colorant including at least two types of colorants which have different average particle diameters with different distributions which includes emulsifying a polymerization composition including a polymerizable unsaturated monomer, an aqueous medium, a colorant, an emulsifier, and a polymerization initiator, preparing a large particulate encapsulated colorant by polymerizing the polymerizable unsaturated monomer on the colorant, and preparing a small particulate encapsulated colorant by adding a supplementary colorant to the mixture during the preparation of the large particulate encapsulated colorant.

In exemplary embodiments, the polymerizable unsaturated monomer may be at least one selected from the group consisting of unsaturated carboxylic acid, vinyl cyanide monomer, unsaturated carboxylic acid alkyl ester, unsaturated carboxylic acid hydroxyalkyl ester, unsaturated carboxylic acid amide and derivatives thereof, and aromatic vinyl monomer.

In exemplary embodiments, the aqueous medium may include water or a mixed solution of water and an organic solvent. An amount of the aqueous medium may be about 500 to about 5,000 parts by weight, and preferably 1,500 to 3,000 parts by weight based on 100 parts by weight of the polymerizable unsaturated monomer. When the amount of the aqueous medium is less than 500 parts by weight, reaction is performed too quickly, and thus the coated resin may be too thick. On the other hand, when the amount of the aqueous medium is greater than 5,000 parts by weight, the monomer may not be easily transferred to each of the reaction sites, and thus the monomer reaction is performed too slowly and the resin may not be properly coated.

In exemplary embodiments, direct dyes, acid dyes, edible dyes, alkali dyes, reactive dyes, dispersing dyes, oil dyes, various pigments, self-dispersing pigments, and a mixture thereof may be used as the colorant, as described above.

The amount of the colorant may be in the range of about 100 to about 300 parts by weight, and preferably 150 to 250 parts by weight based on 100 parts by weight of the polymerizable unsaturated monomer. When the amount of the colorant is less than 100 parts by weight, too much resin is coated on the colorant. On the other hand, when the amount of the colorant is greater than 300 parts by weight, too little resin is coated on the colorant.

In exemplary embodiments, the emulsifier may be a nonionic, an anionic, or an ampholytic emulsifier.

In exemplary embodiments, an amount of the emulsifier may be in the range of about 0.01 to about 10 parts by weight, and preferably about 0.1 to about 7 parts by weight based on 100 parts by weight of the polymerizable unsaturated monomer. When the amount of the emulsifier is less than 0.01 parts by weight, it is less than a critical micelle concentration and thus emulsion polymerization is not efficiently performed. When the amount of the emulsifier is greater than 10 parts by weight, bubbles are generated by excess amount of the emulsifier after the reaction.

In exemplary embodiments, the emulsification may be direct emulsification in which a colorant dispersion is emulsified in a polymerizable unsaturated monomer and in an aqueous medium including an emulsifier using a homogenizer such as a homo mixer, a line mixer, or a high pressure homogenizer, or natural emulsification in which an emulsifier is added to a colorant dispersion in a polymerizable unsaturated monomer and the mixture is poured into a large amount of water.

In addition, phase transition emulsification may be used in which an emulsifier is added to a colorant dispersion in a polymerizable unsaturated monomer and water is added thereto by small amounts, while stirring the mixture.

In exemplary embodiments, the polymerization initiator may include a water soluble or oil soluble persulfate, a peroxide, an azo compound, or a redox composition of a peroxide and a reducing agent, for example, a phosphorous acid salt. Exemplary embodiments of the polymerization initiator are ammonium persulfate, potassium persulfate, sodium persulfate, hydrogen peroxide, t-buyl hydroxy peroxide, t-butyl peroxy benzoate, 2,2-azobis-isobutyronitrile, 2,2-azobis(2-diaminopropane)hydrochloride, and 2,2-azobis(2,4-dimethylvaleronitrile).

In exemplary embodiments, an amount of the polymerization initiator may be about 0.05 to about 3 parts by weight, and preferably about 0.5 to about 1.5 parts by weight based on 100 parts by weight of the polymerizable unsaturated monomer. When the amount of the polymerization initiator is less than 0.5 parts by weight, reaction is not smoothly initiated and reaction is performed too slowly. On the other hand, when the amount of the polymerization initiator is greater than 3 parts by weight, the reaction is performed too fast to control the reaction velocity.

In exemplary embodiments, the polymerization initiator may be added to the polymerization reaction with other ingredients such as the polymerizable unsaturated monomer, the aqueous medium, the colorant, the crosslinkable monomer, the chain transfer agent, and the emulsifier in the initial stage of the reaction, or added thereto after emulsifying the other ingredients and heating the mixture. In the current exemplary embodiment, the reaction velocity is not easily controlled when the polymerization initiator is added in the initial stage of the reaction but the reaction velocity is easily controlled when the polymerization initiator is added after emulsification.

In addition, in exemplary embodiments, an encapsulated colorant coated with a polymer resin having a crosslink structure may be prepared by further adding a crosslinkable monomer to the polymerization composition and preparing a large particulate encapsulated colorant by polymerizing the polymerizable unsaturated monomer and the crosslinkable monomer on the colorant.

That is, when the polymer resin includes a crosslink structure, the method of preparing an encapsulated colorant according to the present general inventive concept includes emulsifying a polymerization composition including a polymerizable unsaturated monomer, an aqueous medium, a colorant, a crosslinkable monomer, an emulsifier, and a polymerization initiator, preparing a large particulate encapsulated colorant by polymerizing the polymerizable unsaturated monomer and the crosslinkable monomer on the colorant, and preparing a small particulate encapsulated colorant by adding a supplementary colorant to the mixture during the preparation of the large particulate encapsulated colorant.

In the current exemplary embodiment, the crosslinkable monomer may be (meth)acrylate or vinyl compounds, as described above.

In exemplary embodiments, an amount of the crosslinkable monomer may be in the range of about 10 to about 80 parts by weight, and preferably about 15 to about 60 parts by weight based on 100 parts by weight of the polymerizable unsaturated monomer. When the amount of the crosslinkable monomer is less than 10 parts by weight, too large polymer resin is synthesized due to too low degree of crosslinking. On the other hand, when the amount of the crosslinkable monomer is greater than 80 parts by weight, too small polymer resin is synthesized due to too high degree of crosslinking.

In exemplary embodiments, the polymerization composition may further include a chain transfer agent which is selected from the group consisting of a sulfur containing compound, a phosphorous acid compound, a hypophosphorous acid compound, and an alcohol, as described above. However, the present general inventive concept is not limited thereto.

In exemplary embodiments, an amount of the chain transfer agent may be in the range of about 0.05 to about 5 parts by weight, and preferably about 0.5 to about 2 parts by weight based on 100 parts by weight of the polymerizable unsaturated monomer. When the amount of the chain transfer agent is less than 0.05 parts by weight, the degree of crosslinking is too high. On the other hand, when the amount of the chain transfer agent is greater than 5 parts by weight, the degree of crosslinking is too low.

In addition, in exemplary embodiments, the polymerization composition may further include additives such as a UV absorber, an antioxidant, and a color developer if desired.

In exemplary embodiments, an amount of the added supplementary colorant may be in the range of about 20 to about 120 parts by weight, and preferably about 40 to about 100 parts by weight based on 100 parts by weight of the polymerizable unsaturated monomer. When the amount of the added supplementary colorant is less than 20 parts by weight, work efficiency in low shear and high shear region are not sufficiently improved, since complex particles are not formed. On the other hand, when the amount of the added supplementary colorant is greater than 120 parts by weight, optical density of printed images may be decreased since the amount of the small particulate colorant is increased.

In the current exemplary embodiment, the supplementary colorant may be added when a yield of the large particulate encapsulated colorant reaches about 60 to about 90%, preferably about 70 to about 85% by forming the polymer resin by polymerizing the polymerizable unsaturated monomer and the crosslinkable monomer on the colorant included in the initial polymerization composition.

When the supplementary colorant is added thereto before the yield of the large particulate encapsulated colorant reaches 60%, the particle size of the colorant may not be differentiated. On the other hand, when the supplementary colorant is added thereto after the yield of the large particulate encapsulated colorant is over 90%, too fine coloring resin particles are formed.

In addition, the present general inventive concept provides an ink composition including an encapsulated colorant, an organic solvent, and water.

In the ink composition, the amount of the encapsulated colorant may be in the range of about 1 to about 20 parts by weight, preferably about 2 to about 10 parts by weight, and more preferably about 3 to about 7 parts by weight based on 100 parts by weight of the ink composition.

When the amount of the encapsulated colorant is less than 1 part by weight, desired optical density may not be obtained. On the other hand, when the amount of the encapsulated colorant is greater than 20 parts by weight, viscosity of the ink composition is increased too high and ejecting efficiency can be decreased.

In exemplary embodiments, the solvent used in the ink composition may be a water-based solvent and may further include at least one organic solvent. An amount of the solvent may be about 80 to about 99 parts by weight, preferably about 85 to about 98 parts by weight, and more preferably about 90 to about 97 parts by weight based on 100 parts by weight of the ink composition.

When the amount of the solvent is less than 80 parts by weight, viscosity of the ink composition is too high and ejecting efficiency can be decreased. On the other hand, when the amount of the solvent is greater than 99 parts by weight, surface tension of the ink composition is increased and thus ejecting efficiency can be decreased.

In exemplary embodiments, the organic solvent that is included in the solvent may include at least one of a monohydric alcohol, a ketone, an ester, a polyhydric alcohol, a nitrogen-containing compound, and a sulfur-containing compound.

In exemplary embodiments, the alcohol used as an organic solvent may include methyl alcohol, ethyl alcohol, n-propyl alcohol, isopropyl alcohol, n-butyl alcohol, sec-butyl alcohol, t-butyl alcohol, or isobutyl alcohol. The ketone may include acetone, methylethyl ketone, diethyl ketone, or diacetone alcohol. The ester may include methyl acetate, ethyl acetate or ethyl lactate. The polyhydric alcohol may include ethylene glycol, diethylene glycol, triethylene glycol, propylene glycol, butylene glycol, 1,4-buthandiol, 1,2,4-buthantriol, 1,5-pentanediol, 1,2,6-hexanetriol, hexylene glycol, glycerol, glycerol ethoxylate, and trimethylol propane ethoxylate. A monohydric alcohol which is used as an organic solvent controls surface tension of ink, and thus may improve permeation and dot formation properties in a recording medium, such as paper, for professional or nonprofessional use and drying properties of a printed image. A polyhydric alcohol and its derivatives are not easily evaporated, and lower the freezing point of the ink, and thus may improve storage stability of the ink to thereby prevent nozzles from being blocked.

Exemplary embodiments of the nitrogen-containing compound which is used as an organic solvent include 2-pyrrolidone and N-methyl-2-pyrrolidone, and examples of the sulfur-containing compound include dimethyl sulfoxide, tetramethyl sulfone, and thioglycol.

When the organic solvent is used together with the water-based solvent, an amount of the organic solvent may be about 0.1 to about 130 parts by weight, and preferably about 10 to about 50 parts by weight based on 100 parts by weight of water. When the amount of the organic solvent is less than 0.1 parts by weight, surface tension of ink is excessively increased. On the other hand, when the amount of the solvent is greater than 130 parts by weight, viscosity of the ink composition is too high and ejecting efficiency can be decreased.

The ink composition according to the present general inventive concept may further include various additives to improve properties of the ink composition, and more particularly may include at least one selected from the group consisting of a wetting agent, a dispersing agent, a surfactant, a viscosity modifier, a pH regulator, and an antioxidizing agent. The amount of the additives may be in the range of about 0.5 to about 600 parts by weight, and preferably about 10 to about 300 parts by weight based on 100 parts by weight of the colorant. When the amount of the additives are less than 0.5 parts by weight, the properties of the additives may not be represented. On the other hand, when the amount of the additives is greater than 600 parts by weight, storage stability may be decreased.

In particular, in exemplary embodiments, the surfactant may be, for example, an ampholytic, an anionic, a cationic, or a nonionic surfactant, and any other surfactant may be used according to its purpose without limitation. In exemplary embodiments, the surfactant may be used alone or in combination of at least two surfactants.

Exemplary embodiments of the ampholytic surfactant include alanine, dodecyldi(aminoethyl)glycine, di(octylaminoethyl)glycine, and N-alkyl-N,N-dimethyl ammonium betane.

Exemplary embodiments of the anionic surfactant include alkylbenzene sulfonate, α-olefin sulfonate, polyoxyethylene-alkyl ether acetate, and phosphate ester.

Exemplary embodiments of the cationic surfactant include an amine salt surfactant such as alkyl amine salt, aminoalcohol fatty acid derivatives, polyamine fatty acid derivatives, and imidazoline, and a quaternary ammonium salt surfactant such as alkyltrimethyl ammonium salt, dialkyldimethyl ammonium salt, alkyldimethyl benzylammonium salt, pyridinium salt, alkylisoquinolinium salt, and benzethonium chloride salt.

Exemplary embodiments of the nonionic surfactant include polyoxyethylenealkylether surfactant, polyoxyethylenealkylphenylether surfactant, and acetylene glycol surfactant.

Among these surfactants, in an exemplary embodiment, the nonionic surfactant is preferable since it has superior antifoaming properties.

In exemplary embodiments, the nonionic surfactant may include SURFYNOL® of Air Products, Inc. having an acetylenic ethoxylated diol structure, TERGITOL™ of Carbide corporation having apolyethylene oxide or polypropylene oxide structure, Tween™ having a polyoxyethylene sorbitan fatty acid este structure, or the like.

The ink composition of the present general inventive concept may have a surface tension of about 15 to about 70 dyne/cm, preferably about 25 to about 55 dyne/cm at 20° C. and a viscosity of about 1 to about 20 cps, preferably about 1.5 to about 3.5 cps at 20° C. to have optimized properties. When the surface tension is not within the range stated above, a printing efficiency may be decreased, and when the viscosity is not within the range above, an ejection of the ink composition may not be properly performed.

An ink set including at least two ink compositions prepared according to the present general inventive concept is prepared.

The ink set may be used in an ink receiving unit of an inkjet recording apparatus or in a cartridge for an inkjet printer. An inkjet recording apparatus according to the present general inventive concept may include a thermal head from which ink droplets are ejected by vapor pressure obtained from heating the ink composition, a piezo head from which ink droplets are ejected by a piezo device, a disposable head or a permanent head. However, the present general inventive concept is not limited thereto. In addition, the inkjet recording apparatus may be a scanning type printer or an array type printer, and may be used for a desktop, textile, and/or an industrial purpose. These head types, printer types, and uses of the inkjet recording apparatus are described for illustrative purposes only, and therefore, the use of the inkjet recording apparatus is not limited thereto.

The substituents which are used in the present general inventive concept may be defined as follows.

The alkyl group as a substitute herein indicates a saturated, monovalent, straight or branched hydrocarbon group having 1-20 carbon atoms, preferably 1-10 carbon atoms, and more preferably 1-6 carbon atoms. Exemplary embodiments of the unsubstituted alkyl group include methyl, ethyl, propyl, isobutyl, sec-butyl, tert-butyl, pentyl, iso-amyl, and hexyl. At least one hydrogen atom in the alkyl group may be substituted with a halogen atom, a hydroxy group, a nitro group, a cyano group, a substituted, or unsubstituted amino group (—NH2, —NH(R) and —N(R')(R''), wherein R' and R'' are each independently a C1-10 alkyl group), an amidino group, a hydrazine or hydrozone group, a carboxylic group, a sulfonic acid group, a phosphoric acid group, a C1-C20 alkyl group, a C1-C20 halogenated alkyl group, a C1-C20 alkenyl group, a C1-C20 alkynyl group, a C1-C20 heteroalkyl group, a C6-C20 aryl group, a C6-C20 arylalkyl group, a C6-C20 heteroaryl group, or a C6-C20 heteroarylalkyl group.

Figure 1:
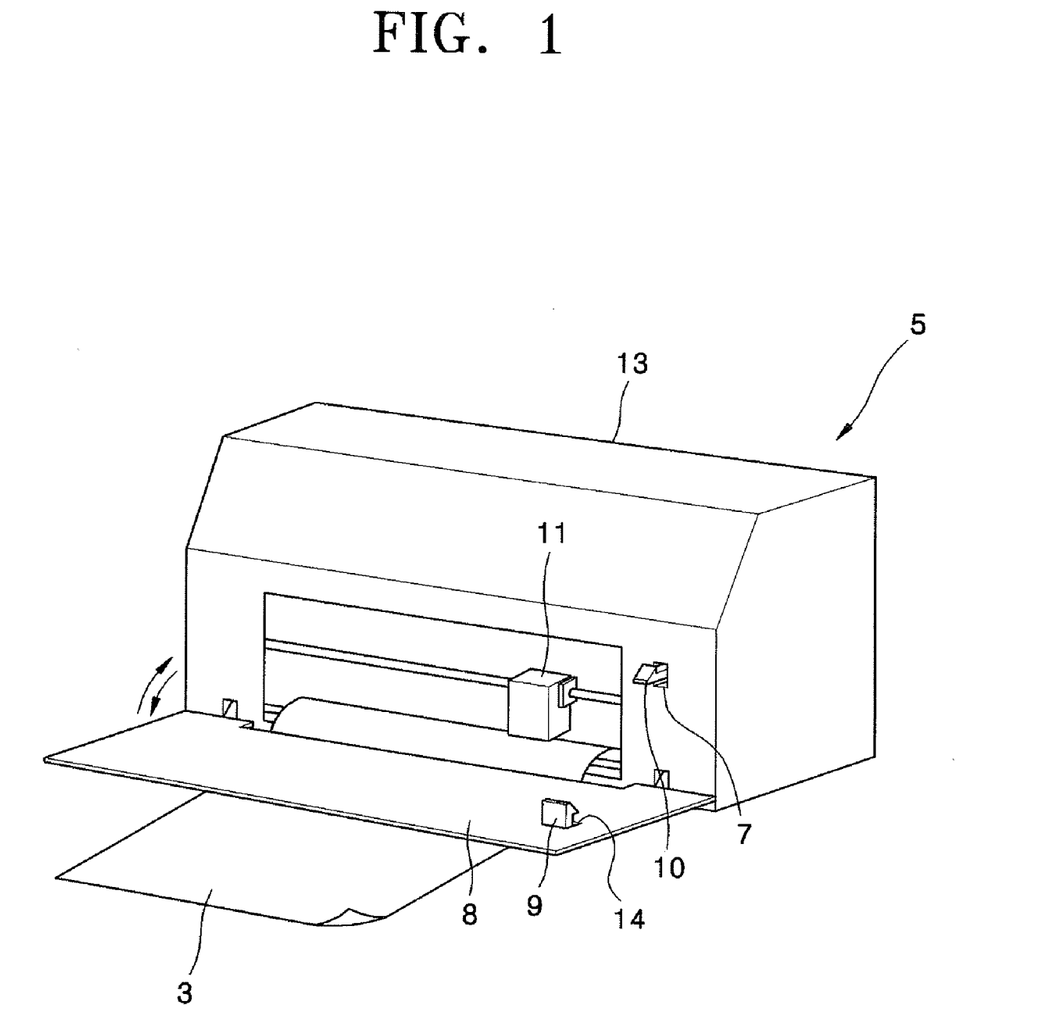
FIG. 1 is a perspective view illustrating an inkjet recording apparatus including an ink cartridge according to an exemplary embodiment of the present general inventive concept.

FIG. 1 is a perspective view illustrating an inkjet recording apparatus according to an exemplary embodiment of the present general inventive concept.

Referring to FIG. 1, the inkjet recording apparatus includes an inkjet printer cartridge 11 having an ink composition which contains a macrochromophore colorant and pseudocolorant additives. A printer cover 8 is connected to a main body 13 of a printer 5. An engaging portion of a movable latch 10 protrudes through a hole 7. The movable latch 10 engages with a fixed latch 9 which is coupled to an inner side of the printer cover 8, when the printer cover 8 is closed. The printer cover 8 includes a recess 14 in a region which corresponds to the engaging portion of the movable latch 10 which protrudes through the hole 7. The inkjet printer cartridge 11 is positioned such that ink may be ejected onto a print medium 3, such as a paper, that passes under the ink cartridge 11.

Figure 2:
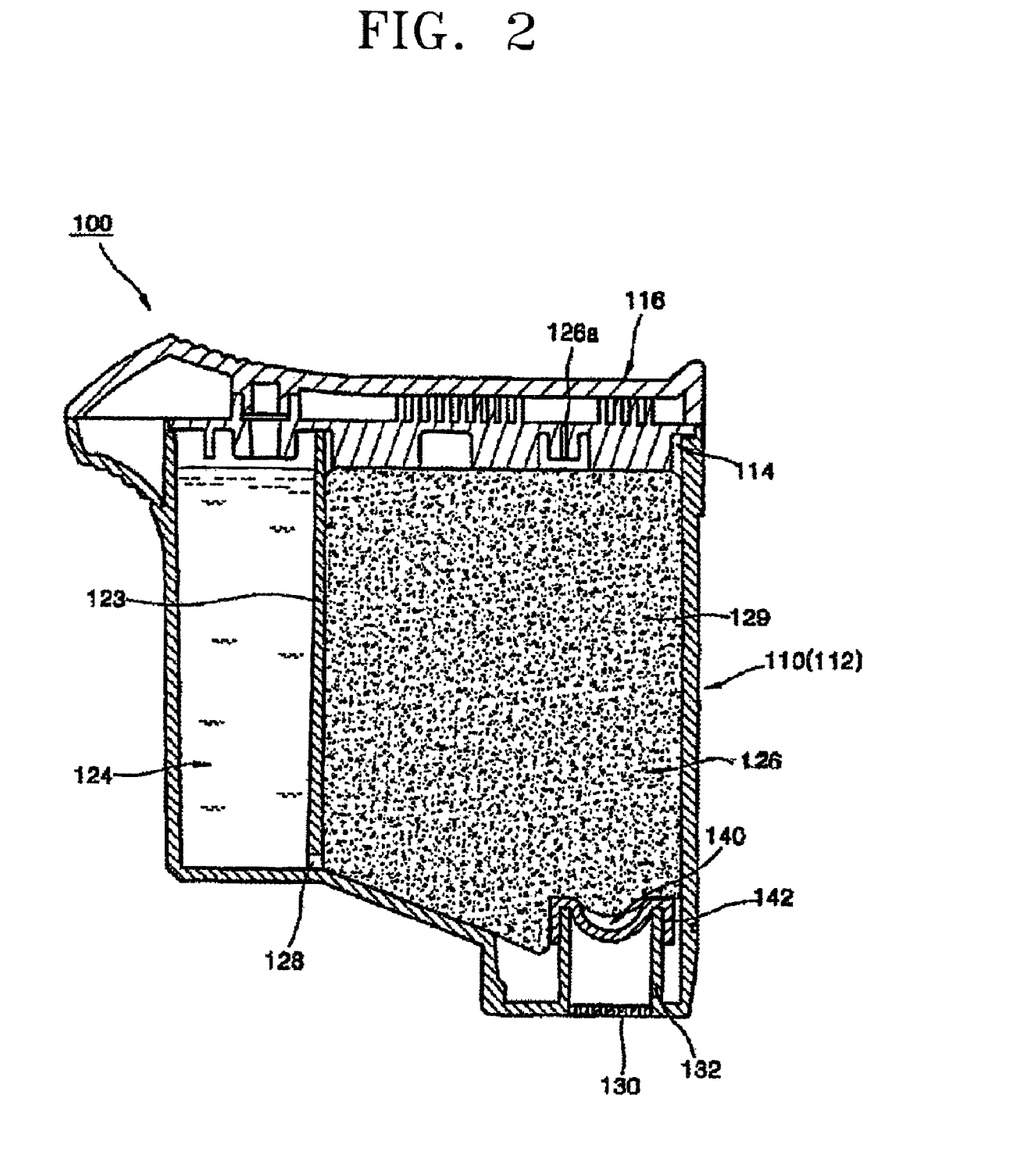
FIG. 2 is a cross-sectional view illustrating an ink cartridge according to an exemplary embodiment of the present general inventive concept.

FIG. 2 is a cross-sectional view illustrating an ink cartridge of an inkjet printer having an ink set according to the present general inventive concept. Referring to FIG. 2, the inkjet printer cartridge 100 includes an ink cartridge main body 110 including an ink storage tank 112, an inner cover 114 to cover a top portion of the ink storage tank 112, a sponge 129 disposed within the ink storage tank 112 and an outer cover 116 which is separated by a predetermined gap from the inner cover 114 and seals the ink storage tank 112 and the inner cover 114.

The ink storage tank 112 is divided into a first chamber 124 and a second chamber 126 by a vertical barrier wall 123. An ink passage 128 between the first chamber 124 and the second chamber 126 is formed in a bottom portion of the vertical barrier wall 123. The first chamber 124, the sponge 129, and the second chamber 126 are filled with ink. A bent hole 126a which corresponds to the second chamber 126 is disposed in the inner cover 114.

In addition, a filter 140 is disposed in a lower portion of the second chamber 126, so that ink impurities and fine bubbles are filtered out in order to prevent or substantially reduce ejection holes of a printer head 130 from being blocked. A hook 142 is formed in an edge of the filter 140 and is coupled to a top portion of a standpipe 132. Thus, ink is ejected from the ink storage tank 120 onto a printing medium 3 in a liquid-drop form through the ejection holes of the printer head 130.

Hereinafter, the present general inventive concept will be described in greater detail with reference to the following examples and comparative examples. The following examples are for illustrative purposes only and therefore are not intended to limit the scope of the present general inventive concept.

Preparation of Encapsulated Colorant Having Two Types of Particle Diameter Distribution Example 1-1

1,360 g of distilled water, 324.8 g of carbon black (Cabojet-300, Cabot Co.), 7 g of sodium hydroxide, 9 g of disodium didodecyl diphenyl oxide disulfonate (DPOS 45, CYTEC Industries Inc., U.S.A.), 32.4 g of itaconic acid, 10 g of acrylic acid, and 120 g of styrene monomer were added to a 5 l high-temperature and high-pressure reactor equipped with a stirrer, and the reactor was substituted with nitrogen while stirring at 250 rpm. Then, the pressure of the reactor was increased to 2 kg/cm$^3$ by introducing nitrogen into the reactor. After the mixture was sufficiently mixed by stirring for 30 minutes and when the temperature of the reactor reached 77° C., 0.36 g of ammonium persulfate was added to the reactor. Then, a large particulate encapsulated colorant was prepared while stirring at 70° C. for 300 minutes. Here, 89 g of supplementary carbon black was added to the reactor during the preparation of the large particulate encapsulated colorant 50 minutes before the reaction was terminated, and the mixture was stirred to prepare a small particulate encapsulated colorant.

Example 1-2

1,360 g of distilled water, 288 g of carbon black (Cabojet-300, Cabot Co.), 7 g of sodium hydroxide, 9 g of disodium didodecyl diphenyl oxide disulfonate (DPOS 45, CYTEC Industries Inc., U.S.A.), 32.4 g of itaconic acid, 10 g of acrylic acid, and 120 g of styrene monomer were added to a 5 l high-temperature and high-pressure reactor equipped with a stirrer, and the reactor was substituted with nitrogen while stirring at 250 rpm. Then, the pressure of the reactor was increased to 2 kg/cm$^3$ by introducing nitrogen into the reactor. After the mixture was sufficiently mixed by stirring for 30 minutes and when the temperature of the reactor reached 77° C., 0.36 g of ammonium persulfate was added to the reactor. Then, a large particulate encapsulated colorant was prepared while stirring at 70° C. for 300 minutes. Here, 120 g of supplementary carbon black was added to the reactor during the preparation of the large particulate encapsulated colorant 50 minutes before the reaction was terminated, and the mixture was stirred to prepare a small particulate encapsulated colorant.

Example 1-3

1,360 g of distilled water, 246 g of carbon black (Cabojet-300, Cabot Co.), 7 g of sodium hydroxide, 9 g of disodium didodecyl diphenyl oxide disulfonate (DPOS 45, CYTEC Industries Inc., U.S.A.), 32.4 g of itaconic acid, 10 g of acrylic acid, 120 g of styrene monomer, and 14.8 g of t-dodecyl mercaptan were added to a 5 l high-temperature and high-pressure reactor equipped with a stirrer, and the reactor was substituted with nitrogen while stirring at 250 rpm. Then, the pressure of the reactor was increased to 2 kg/cm$^3$ by introducing nitrogen into the reactor. After the mixture was sufficiently mixed by stirring for 30 minutes and when the temperature of the reactor reached 77° C., 0.36 g of ammonium persulfate was added to the reactor. Then, a large particulate encapsulated colorant was prepared while stirring at 70° C. for 300 minutes. Here, 151 g of supplementary carbon black was added to the reactor during the preparation of the large particulate encapsulated colorant 50 minutes before the reaction was terminated, and the mixture was stirred to prepare a small particulate encapsulated colorant.

Example 1-4

1,360 g of distilled water, 278 g of carbon black (Cabojet-300, Cabot Co.), 7 g of sodium hydroxide, 9 g of disodium didodecyl diphenyl oxide disulfonate (DPOS 45, CYTEC Industries Inc., U.S.A.), 32.4 g of itaconic acid, 10 g of acrylic acid, 120 g of styrene monomer, and 21.4 g of t-dodecyl mercaptan were added to a 5 l high-temperature and high-pressure reactor equipped with a stirrer, and the reactor was substituted with nitrogen while stirring at 250 rpm. Then, 30 g of butadiene monomer was added to the reactor and the pressure of the reactor was increased to 2 kg/cm$^3$ by introducing nitrogen into the reactor. After the mixture was sufficiently mixed by stirring for 30 minutes and when the temperature of the reactor reached 77° C., 0.36 g of ammonium persulfate was added to the reactor. Then, a large particulate encapsulated colorant was prepared while stirring at 70° C. for 300 minutes. Here, 148 g of supplementary carbon black was added to the reactor during the preparation of the large particulate encapsulated colorant 50 minutes before the reaction was terminated, and the mixture was stirred to prepare a small particulate encapsulated colorant.

Comparative Example 1-1

1,360 g of distilled water, 323 g of carbon black (Cabojet-300, Cabot Co.), 7 g of sodium hydroxide, 9 g of disodium didodecyl diphenyl oxide disulfonate (DPOS 45, CYTEC Industries Inc., U.S.A.), 32.4 g of itaconic acid, 10 g of acrylic acid, 120 g of styrene monomer, and 14.8 g of t-dodecyl mercaptan were added to a 5 l high-temperature and high-pressure reactor equipped with a stirrer, and the reactor was substituted with nitrogen while stirring at 250 rpm. Then, 30 g of butadiene monomer was added to the reactor and the pressure of the reactor was increased to 2 kg/cm$^3$ by introducing nitrogen into the reactor. After the mixture was sufficiently mixed by stirring for 30 minutes and when the temperature of the reactor reached 77° C., 0.36 g of ammonium persulfate was added to the reactor. Then, a large particulate encapsulated colorant was prepared while stirring at 70° C. for 300 minutes.

Comparative Example 1-2

1,360 g of distilled water, 408 g of carbon black (Cabojet-300, Cabot Co.), 7 g of sodium hydroxide, 9 g of disodium didodecyl diphenyl oxide disulfonate (DPOS 45, CYTEC Industries Inc., U.S.A.), 32.4 g of itaconic acid, 10 g of acrylic acid, 120 g of styrene monomer, and 21.4 g of t-dodecyl mercaptan were added to a 5 l high-temperature and high-pressure reactor equipped with a stirrer, and the reactor was substituted with nitrogen while stirring at 250 rpm. Then, 30 g of butadiene monomer was added to the reactor and the pressure of the reactor was increased to 2 kg/cm$^3$ by introducing nitrogen into the reactor. After the mixture was sufficiently mixed by stirring for 30 minutes and when the temperature of the reactor reached 77° C., 0.36 g of ammonium persulfate was added to the reactor. Then, a large particulate encapsulated colorant was prepared while stirring at 70° C. for 300 minutes.

Experimental Example 1

Measuring Average Particle Diameter and Particle Diameter Distribution

Average particle diameters and particle diameter distributions of encapsulated colorants prepared according to Examples 1-1 to 1-4, Comparative Examples 1-1 and 1-2 were measured using a laser light scattering distribution analyzer (LA-910, HORIBA Ltd.), and the results are shown in Table 1 below.

TABLE 1

|  | Large particulate encapsulated colorant | | Small particulate encapsulated colorant | |
| --- | --- | --- | --- | --- |
|  | Average particle diameter (nm) | % by weight (%) | Average particle diameter (nm) | % by weight (%) |
| Example 1-1 | 158 | 78 | 52 | 22 |
| Example 1-2 | 132 | 71 | 64 | 29 |
| Example 1-3 | 111 | 62 | 69 | 38 |
| Example 1-4 | 122 | 65 | 65 | 35 |
| Comparative Example 1-1 | 236 | 100 | — | — |
| Comparative Example 1-2 | 187 | 100 | — | — |

Preparation of Ink Composition

A colorant (encapsulated colorant prepared according to Examples 1-1 to 1-4, Comparative Examples 1-1 and 1-2, and conventional colorant), water, an organic solvent and additives were mixed as listed below, and the mixture was sufficiently stirred in a stirrer for more than 30 minutes to a homogenized state. Then, the mixture was passed through a 0.45 μm filter to prepare an ink composition of Examples 2-1 to 2-4 and Comparative Examples 2-1 to 2-4.

Example 2-1

| Encapsulated colorant prepared in Example 1-1 | 4.5 parts by weight |
| --- | --- |
| Glycerol | 7.5 parts by weight |
| Diethylene glycol | 8 parts by weight |
| Water (deionized water) | 80 parts by weight |
| Glycerol propoxylate | 4 parts by weight |
| 1,3-dimethyl-3,4,5,6-tetrahydro-pyrimidinone | 4 parts by weight |

Example 2-2

| Encapsulated colorant prepared in Example 1-2 | 4.5 parts by weight |
| --- | --- |
| Glycerol | 7.5 parts by weight |
| Diethylene glycol | 8 parts by weight |
| Water (deionized water) | 80 parts by weight |
| Trimethylol propane propoxylate | 4 parts by weight |
| 1,3-dimethyl-3,4,5,6-tetrahydro-pyrimidinone | 4 parts by weight |

Example 2-3

| Encapsulated colorant prepared in Example 1-3 | 4.5 parts by weight |
| --- | --- |
| Glycerol | 7.5 parts by weight |
| Diethylene glycol | 8 parts by weight |
| Water (deionized water) | 80 parts by weight |
| Pentaerythritol propoxylate | 4 parts by weight |
| 1,3-dimethyl-2-imidazolidinone | 4 parts by weight |

Example 2-4

| Encapsulated colorant prepared in Example 1-4 | 4.5 parts by weight |
| --- | --- |
| Glycerol | 7.5 parts by weight |
| Diethylene glycol | 8 parts by weight |
| Water (deionized water) | 80 parts by weight |
| 1,3-dimethyl-2-imidazolidinone | 4 parts by weight |
| 1,3-dimethyl-3,4,5,6-tetrahydro-pyrimidinone | 4 parts by weight |

Comparative Example 2-1

| Raven 5250 (Columbian Co.) (average particle diameter: 125 nm) | 4.5 parts by weight |
| --- | --- |
| Glycerol | 7.5 parts by weight |
| Diethylene glycol | 8.0 parts by weight |
| Water (deionized water) | 80.0 parts by weight |

Comparative Example 2-2

| Regal 330 (Cabot Co.) (average particle diameter: 113 nm) | 4.5 parts by weight |
| --- | --- |
| Glycerol | 7.5 parts by weight |
| Diethylene glycol | 8.0 parts by weight |
| Water (deionized water) | 80.0 parts by weight |

Comparative Example 2-3

| | |
|---|---|
| Encapsulated colorant prepared in Comparative Example 1-1 | 4.5 parts by weight |
| Glycerol | 7.5 parts by weight |
| Diethylene glycol | 8.0 parts by weight |
| Water (deionized water) | 80.0 parts by weight |

Comparative Example 2-4

| | |
|---|---|
| Encapsulated colorant prepared in Comparative Example 1-2 | 4.5 parts by weight |
| Glycerol | 7.5 parts by weight |
| Diethylene glycol | 8.0 parts by weight |
| Water (deionized water) | 80.0 parts by weight |

Experimental Example 1

Ejection Lifetime Test

Ejection lifetime of ink compositions prepared according to Examples 2-1 to 2-4 and Comparative Examples 2-1 to 2-4 was measured when ejected at 6 kHz using an ejection device manufactured by Samsung Corporation, and the results are shown in Table 2.

A=ejection lifetime (number of ejectable dots)
□: A>100 million
○: 50 million≦A<100 million
X: 10 million≦A<50 million
XX: A<10 million

Experimental Example 2

Cartridge Storage Stability Test

The degree of nozzle blocking was measured when printing was performed after storing each of the ink sets prepared according to Examples 2-1 to 2-4 and Comparative Examples 2-1 to 2-4 in ink cartridges of Samsung Corporation at room temperature (25° C.) and at a low temperature (−5° C.) for 2 weeks, and the results are shown in Table 2.
□: 5% or less nozzles were blocked
○: 6-10% nozzles were blocked
X: 11-20% nozzles were blocked
XX: 21% or more nozzles were blocked

Experimental Example 3

Missing Dot Test

The ink compositions prepared according to Examples 2-1 to 2-4 and Comparative Examples 2-1 to 2-4 were refilled into an ink cartridge (Samsung Corporation), and a solid pattern (10×10 cm) was printed by 50% coverage. The degree of missing dot was measured as follows, and the results are shown in Table 2.
A=(number of missing dot/number of total dots)×100(%)
□: A<10×
○: 10≦A<20
X: 20≦A≦30
XX: A>30

Experimental Example 4

Waterfastness Test

The ink compositions prepared according to Examples 2-1 to 2-4 and Comparative Examples 2-1 to 2-4 were refilled into an ink cartridge M-50 (Samsung Corporation), and a bar pattern (2×10 cm) was printed using a printer (MJC-2400C, Samsung Corporation). After 5 minutes, 5 droplets of water were dropped thereto, and then the printed resultant was dried for 24 hours. Then, a reduced OD of the image after water flew thereon was compared with OD of original bar pattern, and represented as percentage, and the results are shown in Table 2.
A=(OD of image after water flew thereon/OD of original bar pattern)×100(%)
□: 95≦A
○: 90≦A<95,
X: 85≦A<90
XX: A<85

Experimental Example 5

Printed Gloss Test

The ink compositions prepared according to Examples 2-1 to 2-4 and Comparative Examples 2-1 to 2-4 were refilled into an ink cartridge M-50 (Samsung Corporation), and a bar pattern (2×10 cm) was printed using a printer (MJC-2400C, Samsung Corporation). Printed gloss was measured after 120 minutes using a glossmeter (micro-tri-gross, BYK Co.), and the results are shown in Table 2.
□: 40≦A
○: 35≦A<40
X: 30≦A<35
XX: A<35

TABLE 2

| | Ejection lifetime | Cartridge storage stability | Missing dot | Waterfastness | Printed gloss |
|---|---|---|---|---|---|
| Example 2-1 | □ | □ | □ | □ | □ |
| Example 2-2 | □ | ○ | □ | □ | □ |
| Example 2-3 | □ | □ | ○ | □ | □ |
| Example 2-4 | □ | □ | □ | □ | ○ |
| Comparative Example 2-1 | X | X | X | □ | X |
| Comparative Example 2-2 | □ | X | X | X | □ |
| Comparative Example 2-3 | X | □ | □ | ○ | □ |
| Comparative Example 2-4 | X | □ | X | □ | ○ |

As shown in Table 2, the ink compositions using the encapsulated colorant having two types of average particle diameter distribution, i.e., large particulate and small particulate colorants prepared according to Examples 2-1 to 2-4 have superior properties in ejection lifetime, cartridge storage stability, missing dot, waterfastness, and printed gloss as compared to the ink compositions of Comparative Examples 2-1 to 2-4, including the colorant having a particle diameter similar to that of the colorant of Examples 2-1 to 2-4.

According to the present general inventive concept, the encapsulated colorant has two types of colorants which have different average particle diameters with different distributions. In the preparation of an encapsulated colorant, a supplementary colorant is added to the preparation of an initially added colorant after a specific period of time. Thus, a polymer resin growing on the colorants have a different size. Thus, the present general inventive concept provides an encapsulated colorant having at least two types of average particle diameters with different distributions and has beneficial miscibility since the colorants are coated with a polymer resin. The present general inventive concept also provides an ink composition having superior work efficiency in low shear regions such as mixing and transferring the colorants and in high shear regions such as inkjet ejection, thereby preventing or substantially reducing nozzles from being blocked and forming images having good printed gloss.

While the present general inventive concept has been particularly shown and described with reference to exemplary embodiments thereof, it will be understood by those of ordinary skill in the art that various changes in form and details may be made therein without departing from the spirit and scope of the present general inventive concept as defined by the following claims.

What is claimed is:

1. An encapsulated colorant comprising:
   a polymer resin; and
   a colorant encapsulated with the polymer resin,
   wherein the encapsulated colorant has at least two different average particle diameters with different distributions with about 60% to about 80% by weight of a large particulate encapsulated colorant having an average particle diameter of about 100 nm to about 300 nm and about 20% to about 40% by weight of a small particulate encapsulated colorant having an average particle diameter of about 40 nm to about 80 nm.

2. The encapsulated colorant of claim 1, wherein the polymer resin is prepared by polymerizing a composition which includes a polymerizable unsaturated monomer.

3. The encapsulated colorant of claim 2, wherein the polymerizable unsaturated monomer is at least one selected from the group consisting of a carboxylic acid, a vinyl cyanide monomer, a carboxylic acid alkyl ester, a carboxylic acid hydroxyalkyl ester, a carboxylic acid amide, an aromatic vinyl monomer, a methyl vinyl ketone, and vinylidene chloride.

4. The encapsulated colorant of claim 1, wherein the polymer resin includes a crosslinked structure.

5. The encapsulated colorant of claim 4, wherein the polymer resin is prepared by polymerizing a composition which includes a polymerizable unsaturated monomer having one polymerizable unsaturated group and a crosslinkable monomer having at least two polymerizable unsaturated groups.

6. The encapsulated colorant of claim 5, wherein the crosslinkable monomer is selected from the group consisting of a (meth)acrylate having at least two polymerizable unsaturated groups and vinyl compounds having at least two polymerizable unsaturated groups.

7. A method of preparing an encapsulated colorant, the method comprising:
   emulsifying a polymerization composition which includes a polymerizable unsaturated monomer having one polymerizable unsaturated group, an aqueous medium, a colorant, an emulsifier, and a polymerization initiator;
   preparing a large particulate encapsulated colorant by polymerizing the polymerizable unsaturated monomer on the colorant; and
   preparing a small particulate encapsulated colorant by adding a supplementary colorant to the large encapsulated colorant during the preparation of the large particulate encapsulated colorant,
   wherein the encapsulated colorant has at least two different average particle diameters with different distributions with about 60% to about 80% by weight of a large particulate encapsulated colorant having an average particle diameter of about 100 nm to about 300 nm and about 20% to about 40% by weight of a small particulate encapsulated colorant having an average particle diameter of about 40 nm to about 80 nm.

8. The method of claim 7, wherein the polymerization composition comprises about 500 to about 5,000 parts by weight of the aqueous medium, about 100 to about 300 parts by weight of the colorant, about 0.01 to about 10 parts by weight of the emulsifier and about 0.05 to about 3 parts by weight of the polymerization initiator based on 100 parts by weight of the polymerizable unsaturated monomer.

9. The method of claim 7, wherein the amount of the added supplementary colorant is about 20 to about 120 parts by weight based on 100 parts by weight of the polymerizable unsaturated monomer.

10. The method of claim 7, wherein the polymerization composition further comprises a crosslinkable monomer having at least two polymerizable unsaturated groups and the large particulate encapsulated colorant is prepared by polymerizing the polymerizable unsaturated monomer and the crosslinkable monomer on the colorant.

11. An ink composition including an encapsulated colorant, the ink composition comprising:
    a polymer resin;
    a solvent; and
    a colorant encapsulated with the polymer resin,
    wherein the encapsulated colorant has at least two different average particle diameters with different distributions.

12. The ink composition of claim 11, wherein an amount of the encapsulated colorant is about 1 to about 20 parts by weight and the amount of the solvent is about 80 to about 99 parts by weight based on 100 parts by weight of the ink composition.

13. The ink composition of claim 11, wherein the solvent comprises water and at least one organic solvent selected from the group consisting of a monohydric alcohol, a ketone, an ester, a polyhydric alcohol, a nitrogen-containing compound, and a sulfur-containing compound.

14. The ink composition of claim 11, wherein the ink composition has a surface tension of about 15 to about 70 dyne/cm at 20° C. and a viscosity of about 1 to about 20 cps at 20° C.

15. An ink set including at least two ink compositions, the ink set comprising:
    a polymer resin; and
    a colorant coated with the polymer resin,
    wherein the colorant has at least two different average particle diameters with different distributions.

16. A cartridge of an inkjet recording apparatus, the cartridge comprising:
    a polymer resin; and
    a colorant coated with the polymer resin,
    wherein the colorant has at least two different average particle diameters with different distributions.

17. An inkjet recording apparatus including a cartridge comprising a polymer resin and a colorant coated with the polymer resin, wherein the colorant has at least two different average particle diameters with different distributions.

* * * * *